US010827369B2

(12) United States Patent
Zhang et al.

(10) Patent No.: US 10,827,369 B2
(45) Date of Patent: Nov. 3, 2020

(54) CELL DISCOVERY AND MEASUREMENT METHOD, BASE STATION AND UE

(71) Applicant: FUJITSU CONNECTED TECHNOLOGIES LIMITED, Kawasaki-shi, Kanagawa (JP)

(72) Inventors: Lei Zhang, Beijing (CN); Yi Wang, Beijing (CN); Hua Zhou, Beijing (CN)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 126 days.

(21) Appl. No.: 15/013,453

(22) Filed: Feb. 2, 2016

(65) Prior Publication Data
US 2016/0150431 A1 May 26, 2016

Related U.S. Application Data
(63) Continuation of application No. PCT/CN2013/080832, filed on Aug. 5, 2013.

(51) Int. Cl.
*H04W 24/08* (2009.01)
*H04W 72/04* (2009.01)
(Continued)

(52) U.S. Cl.
CPC .......... *H04W 24/08* (2013.01); *H04W 24/10* (2013.01); *H04W 48/16* (2013.01); *H04W 56/0015* (2013.01); *H04W 72/0446* (2013.01)

(58) Field of Classification Search
CPC ..... H04W 24/08; H04W 24/10; H04W 48/16; H04W 56/0015; H04W 72/0446; Y02B 60/50
(Continued)

(56) References Cited

U.S. PATENT DOCUMENTS

2010/0165882 A1 7/2010 Palanki et al.
2012/0044928 A1* 2/2012 Bhattad ................ H04J 11/0083
370/350
(Continued)

FOREIGN PATENT DOCUMENTS

CN 102869053 A 1/2013
CN 102883408 A 1/2013
(Continued)

OTHER PUBLICATIONS

Extended European search report with supplementary European search report and the European search opinion issued by the European Patent Office for corresponding European Patent Application No. 13891020.3, dated Feb. 3, 2017.
(Continued)

*Primary Examiner* — Ricky Q Ngo
*Assistant Examiner* — Ellen A Kirillova
(74) *Attorney, Agent, or Firm* — Myers Wolin, LLC.

(57) ABSTRACT

Embodiments of the present disclosure provide a cell discovery and measurement method, a base station and UE. The cell discovery and measurement method includes: a cell base station transmits a discovery signal enabling the cell to be discovered by a UE, and enables the UE to achieve synchronization with the cell base station; and transmits a measurement signal after transmitting the discovery signal. Through the embodiments of the present disclosure, the time for transmitting the discovery signal for a single time can be made as short as possible, an interval between two times of transmitting the discovery signals can be made as long as possible, and the measurement signal is only transmitted in
(Continued)

need, thereby making the cell as energy-saving as possible; and the UE can accurately perform RRM measurement by measuring the signal, thereby increasing precision of the RRM measurement.

20 Claims, 11 Drawing Sheets

(51) Int. Cl.
  *H04W 56/00* (2009.01)
  *H04W 24/10* (2009.01)
  *H04W 48/16* (2009.01)
(58) Field of Classification Search
  USPC .......................................................... 370/252
  See application file for complete search history.

(56) References Cited

U.S. PATENT DOCUMENTS

| | | | |
|---|---|---|---|
| 2012/0231790 A1 | 9/2012 | Lindoff et al. | |
| 2012/0263145 A1 | 10/2012 | Marinier et al. | |
| 2013/0201884 A1* | 8/2013 | Freda | H04W 74/0833 370/278 |
| 2013/0250908 A1* | 9/2013 | Bach | H04W 52/0206 370/331 |
| 2013/0336280 A1* | 12/2013 | Nordstrom | H04L 5/0048 370/330 |
| 2014/0016488 A1* | 1/2014 | Xu | H04W 72/005 370/252 |
| 2014/0038598 A1* | 2/2014 | Ren | H04W 48/16 455/434 |
| 2014/0128084 A1 | 5/2014 | Zhong et al. | |
| 2015/0215852 A1 | 7/2015 | Gou et al. | |

FOREIGN PATENT DOCUMENTS

| | | |
|---|---|---|
| CN | 103179669 A | 6/2013 |
| CN | 102883408 B | 4/2017 |
| EP | 1 876 941 B1 | 3/2015 |
| JP | 2015-527018 A | 9/2015 |
| WO | 2013/040487 A1 | 3/2013 |

OTHER PUBLICATIONS

Huawei et al.: "Discussion on dual dormant/active state cells and cell discovery", Agenda Item: 7.3.5.3, 3GPP TSG-RAN WG1 Meeting #72, R1-130447, St. Julian's, Malta, Jan. 28-Feb. 1, 2013.
Samsung: "Cell discovery for efficient small cell operation", Agenda Item: 6.2.5.2.2, 3GPP TSG-RAN WG1 Meeting #73, R1-131980, Fukuoka, Japan, May 20-24, 2013.
Etri: "Discussion on small-cell discovery", Agenda Item: 7.2.5.3.2, 3GPP TSG-RAN WG1 Meeting #72bis, R1-131141, Chicago, USA, Apr. 15-19, 2013.
Notice of Preliminary Rejection issued for corresponding Korean Patent Application No. 10-2016-7003434 dated Dec. 21, 2016 with an English translation.
Notification of Reasons for Refusal issued for corresponding Japanese Patent Application No. 2016-532172, dated Jul. 25, 2017, with an English translation.
International Search Report issued for corresponding International Patent Application No. PCT/CN2013/080832, dated May 12, 2014, with an English translation.
Written Opinion of the International Searching Authority issued for corresponding International Patent Application No. PCT/CN2013/080832, dated May 12, 2014, with an English translation.
First Office Action issued for corresponding European Patent Application No. 13891020.3 dated May 3, 2018.
First Notification of Office Action issued by the State Intellectual Property Office of China for corresponding Chinese Patent Application No. 201380077984.7, dated Sep. 21, 2018, with an English translation.
Communication pursuant to Article 94(3) EPC issued for corresponding European Application No. 13891020.3, dated Jul. 9, 2019.
Chris Johnson, "Long Term Evolution; in bullets," 2nd Edition, Jul. 6, 2012, pp. 91-95, ISBN: 978-1-4781-6617-7.
Trial and Appeal Decision issued for corresponding Japanese Application No. 2016-532172, dated Sep. 24, 2019, with full English machine translation attached.
The Second Notification of Office Action issued for the corresponding Chinese Patent Application No. 201380077984.7, dated Aug. 20, 2019, with Full English translation attached.

* cited by examiner

CELL DISCOVERY AND MEASUREMENT METHOD, BASE STATION AND UE

CROSS REFERENCE TO RELATED APPLICATIONS

This application is a continuation application of International Application PCT/CN2013/080832 filed on Aug. 5, 2013, the entire contents of which are incorporated herein by reference.

TECHNICAL FIELD

The present disclosure relates to the field of communications, and in particular to a cell discovery and measurement method, a base station and a user equipment (UE).

BACKGROUND

Green communication is one of goals expected to be realized by a new generation of communication system. Hence, how to realize energy saving when a base station is idle is also one of important topics in the discussion of LTE standards under the leadership of the 3GPP organization. It has been shown in studies that energy overhead of a macro cell is mainly consumed by a power amplifier (PA) module, and as reduction of coverage of a cell, i.e. reduction of transmission power of cell base station equipment, a proportion of the power consumption of the PA module drops gradually, and a proportion of power consumption of a baseband (BB) module rises gradually.

For example, the proportion of the power consumption of the PA module of the macro cell is about 57%, while proportions of power consumption of PA modules of a pico cell and a femto cell drop to 26% and 22%, respectively. Correspondingly, the proportion of the power consumption of the BB module rises from 13% of that of the macro cell to 41% of the pico cell and 47% of the femto cell, respectively.

In previous discussion of LTE standards, a method where the PA module is closed when the macro cell is idle is mainly adopted for the energy saving of the macro cell. However, for small cells (such as a pico cell and/or a femto cell, etc.) to which much attention has been paid, achievement made by only closing the PA module is so limited. Therefore, a method of energy saving for small cells becomes an extremely hot topic in the discussion of the current LTE Release 12.

In the related discussion, a method where an idle small cell is made to enter a dormancy mode may be an effective method of energy saving for a small cell. The cell entering the dormancy mode may be referred to as a dormancy cell. For a dormancy cell in a dormancy mode, it is one of effective means for achieving the goal of energy saving to reduce transmission actions of the cell as possible. Therefore, time of a dormancy cell for transmitting signals for a single time should be as short as possible, and an interval between two times of transmission should be as long as possible.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

However, it was found by the inventors that discovery of a cell by a user equipment (UE) and radio resource management (RRM) measurement are performed at the same time currently. After discovering a cell, the UE will actively measure the cell, and report a measurement result to a base station of a serving cell in need (for example, when the measurement result triggers a measurement event that has been configured at the UE side).

For a dormancy cell, it is needed that time for transmitting a discovery signal for a single time should be as short as possible, and an interval between two times of transmission should be as long as possible. However, taking into account that the RRM measurement mainly measures power of the cell for receiving signals and an interference level at the UE so as to provide reference information for making decisions, such as cell handover, if a single time of measurement is performed only on a transmission signal with a very short duration and the interval between two times of transmission is relatively long, it would possibly result in that a difference between a measurement value and a real value of a received signal strength indicator (RSSI) and reference signal received quality (RSRQ) is too large.

This is because that the measurement performed by using the measurement signal transmitted at a single time within a very short duration cannot correctly reflect an interference level subjected by the received signal of the cell due to a too short time of traversing; and the measurement signals transmitted at multiple times are excessively large in intervals, the differences between results of multiple times of measurement and the real values are relatively large, and forced combination will result in relatively large deviation between the measurement values and the real values. Hence, energy saving and accurate RRM measurement cannot be achieved at the same time in a dormancy cell in such scenarios as a small cell or the like in the prior art currently.

Embodiments of the present disclosure provide a cell discovery and measurement method, a base station and a UE, with an object being to make a cell energy-saving and to make the RRM measurement accurate at the same time.

According to an aspect of the embodiments of the present disclosure, there is provided a cell discovery and measurement method, including:

transmitting, by a cell base station, a discovery signal enabling a cell to be discovered by a UE, and enabling the UE to achieve synchronization with the cell base station; and transmitting a measurement signal by the cell base station after transmitting the discovery signal.

According to another aspect of the embodiments of the present disclosure, there is provided a cell discovery and measurement method, including:

receiving, by a serving base station, discovery information for discovering a cell reported by a UE.

According to still another aspect of the embodiments of the present disclosure, there is provided a cell discovery and measurement method, including:

receiving, by a UE, a discovery signal for discovering a cell transmitted by a cell base station, and achieving synchronization with the cell base station;

reporting, by the UE, discovery information for discovering the cell to a serving base station; and receiving a measurement signal transmitted by the cell base station, and measuring the cell according to the measurement signal.

According to still another aspect of the embodiments of the present disclosure, there is provided a base station, including:

a discovery signal transmitting unit configured to transmit a discovery signal enabling a cell to be discovered by a UE, and enable the UE to achieve synchronization with the base station; and a measurement signal transmitting unit configured to transmit a measurement signal after transmitting the discovery signal.

According to still another aspect of the embodiments of the present disclosure, there is provided a base station, including:

a discovery information receiving unit configured to receive discovery information for discovering a cell reported by a UE.

According to still another aspect of the embodiments of the present disclosure, there is provided a UE, including:

a discovery signal receiving unit configured to receive a discovery signal for discovering a cell transmitted by a cell base station, and achieve synchronization with the cell base station;

a discovery information reporting unit configured to report discovery information for discovering the cell to a serving base station; and a measurement signal receiving unit configured to receive a measurement signal transmitted by the cell base station, and measure the cell according to the measurement signal.

According to still another aspect of the embodiments of the present disclosure, there is provided a communication system, including:

a cell base station configured to transmit a discovery signal enabling a cell to be discovered by a UE, enable the UE to achieve synchronization with the cell base station, and transmit a measurement signal after transmitting the discovery signal;

a serving base station configured to receive discovery information discovering the cell reported by a UE;

a UE configured to receive the discovery signal for discovering the cell transmitted by the cell base station, and achieve synchronization with the cell base station; report discovery information discovering the cell to the serving base station; and receive the measurement signal transmitted by the cell base station, and measure the cell according to the measurement signal.

According to still another aspect of the embodiments of the present disclosure, there is provided a computer-readable program, wherein when the program is executed in a base station, the program enables a computer to carry out the cell discovery and measurement method as described above in the base station.

According to still another aspect of the embodiments of the present disclosure, there is provided a storage medium in which a computer-readable program is stored, wherein the computer-readable program enables a computer to carry out the cell discovery and measurement method as described above in a base station.

According to still another aspect of the embodiments of the present disclosure, there is provided a computer-readable program, wherein when the program is executed in a UE, the program enables a computer to carry out the cell discovery and measurement method as described above in the UE.

According to still another aspect of the embodiments of the present disclosure, there is provided a storage medium in which a computer-readable program is stored, wherein the computer-readable program enables a computer to carry out the cell discovery and measurement method as described above in a UE.

An advantage of the embodiments of the present disclosure exists in that by transmitting the discovery signal and the measurement signal respectively by the base station, the time for transmitting the discovery signal for a single time can be made as short as possible, an interval between two times of transmitting the discovery signals can be made as long as possible, and the measurement signal is only transmitted in need, thereby making the cell as energy-saving as possible; and the UE can accurately perform RRM measurement via the measurement signal, thereby increasing precision of the RRM measurement.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
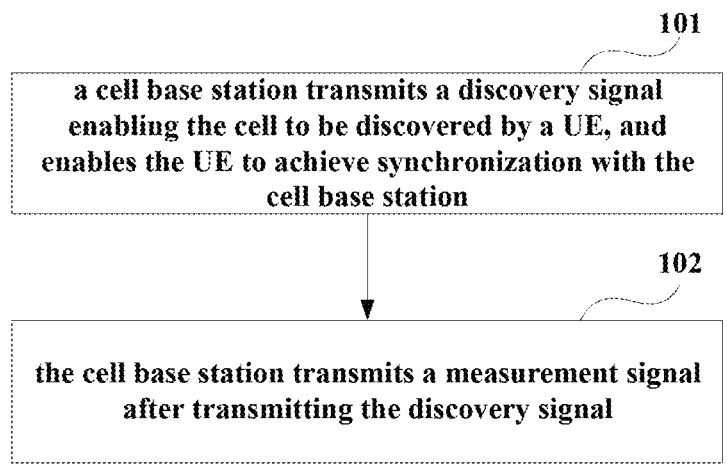
FIG. 1 is a flowchart of the cell discovery and measurement method of Embodiment 1 of the present disclosure.

An embodiment of the present disclosure provides a cell discovery and measurement method, which is applicable to a base station side of a cell. FIG. 1 is a flowchart of the cell discovery and measurement method of the embodiment of the present disclosure. As shown in FIG. 1, the method includes:

step 101: a cell base station transmits a discovery signal enabling a cell to be discovered by a UE, and enables the UE to achieve synchronization with the cell base station; and step 102: the cell base station transmits a measurement signal after transmitting the discovery signal.

In this embodiment, the cell may be a dormancy cell, and may be in a dormancy mode and not serve for the UE temporarily; and the cell base station may a base station of the dormancy cell, and the UE may be served by a serving base station. However, the present disclosure is not limited thereto. For example, the cell may not be a dormancy cell, but a small cell or the like serving for other UEs. The present disclosure shall be described below in detail taking that the cell is a dormancy cell as an example.

In this embodiment, discovery may contain two levels of meaning. One is that the UE is able to detect transmission signals of one or more cells (such as a cell in a dormancy mode), and the other is that the UE is able to identify cell ID(s) of source cell(s) of the one or more transmission signals.

The cell ID may refer to an identifier that may uniquely identify the cell. For example, it may be a cell physical ID, and may also be ID of a cell group or a cell cluster and virtual ID of cells in the cell group or cell cluster. In order to be discovered by the UE, the cell may transmit a discovery signal (a detection signal, an identification signal). The discovery signal has a unique feature consistent with the cell ID, that is, the UE may uniquely determine the cell ID according to the discovery signal. The relevant art may be referred to for detailed contents of the discovery.

In this embodiment, the cell may be an independent cell having an independent physical cell identifier, or a cell having an independent physical cell identifier within a cell group (or cluster); and the discovery signal may include one of the following signals or a combination thereof: a primary synchronization signal (PSS), a secondary synchronization signal (SSS), a common reference signal (CRS), a channel state information reference signal (CSIRS), a positioning reference signal (PRS) and a reduced common reference signal (reduced CRS).

For example, for a single cell, the discovery signal may be conventional PSS/SSS, or a CRS, or a CSIRS, or a PRS, or a reduced CRS. A meaning of "single" here may be that the cell belongs to no cell group (or cluster). If all cells in a cell group (or cluster) have an independent physical cell ID, that is, the cell may be uniquely determined according to the ID, the discovery signal transmitted by the cell may also be conventional PSS/SSS, or a CRS, or a CSIRS, or a PRS, or a reduced CRS.

Following description is given taking that the discovery signal is PSS/SSS as an example.

In an implementation, the discovery signal may be transmitted via a subframe of a frequency division duplex (FDD) system. The PSS and the SSS are arranged at a 0th subframe or a 5th subframe; and the cell base station transmits the 0th subframe and/or the 5th subframe containing the PSS and the SSS.

In particular, taking LTE FDD as an example, the PSS/SSS are often arranged at the 0th subframe and the 5th subframe. The PSS is located at the last OFDM symbol of a first slot of the subframe, and the SSS is located at the last OFDM symbol but one of the first slot of the subframe. The PSSs of the 0th subframe and the 5th subframe are identical, and their SSSs are different.

In LTE communication, a UE often needs at least to detect two SSS samples to determine a subframe index (a part of coarse synchronization) of a cell to be detected, that is, determining which sample belongs to the 0th subframe, and which sample belongs to the 5th subframe. Hence, on the premise that there exists no priori information at a UE side, a cell (such as a cell in a dormancy mode) can make the UE to perform a complete "discovery" process by at least transmitting two subframes, that is, a cell base station may transmit a 0th subframe and a 5th subframe containing a PSS and an SSS.

Furthermore, the cell base station may transmit a 0th subframe or a 5th subframe containing a PSS and an SSS. In particular, a cell (such as an independent LTE FDD cell in a dormancy mode, or an LTE FDD cell having an independent physical cell ID and belonging to a cell group (or cluster)) may agree in advance that PSS/SSS are only transmitted at the 0th subframe or the 5th subframe each time. In this way, even though there exists no priori information at the UE side, the UE may still determine a subframe index uniquely by detecting one subframe only.

In another implementation, the discovery signal may be transmitted via a subframe of a time division duplex (TDD) system. The PSS is arranged at a 1st subframe or a 6th subframe, and the SSS is arranged at a 0th subframe or a 5th subframe; and the cell base station transmits two neighboring subframes or two neighboring slots containing the PSS and the SSS.

In particular, for LTE TDD, the PSS is usually arranged at the third OFDM symbol of the first slot of a 1st subframe and a 6th subframe, and the SSS is usually arranged at the last OFDM symbol of the second slot of a 0th subframe and a 5th subframe. Similar to the LTE FDD, the PSSs of the 1st subframe and the 6th subframe are identical, and SSSs of the 0th subframe and the 5th subframe are different, and the UE often positions the subframe index according to the detection of the SSSs. Hence, on the premise that there exists no priori information at the UE side, a cell (such as a cell in a dormancy mode) can make the UE to perform a complete "discovery" process by at least transmitting two subframes. In order to reduce an amount of transmission signals, the cell may only transmit a part of conventional PSSs and SSSs.

For example, a cell (such as a single LTE TDD cell in a dormancy mode, or an LTE TDD cell having independent physical cell ID and belonging to a cell group (or cluster)) may agree in advance that only PSS/SSS containing the 1st subframe and the 0th subframe or PSS/SSS containing the 6th subframe and the 5th subframe are transmitted each time. In this way, even though there exists no priori information at the UE side, the UE may still determine a subframe index uniquely by detecting one group of PSS/SSS only.

Taking that the PSS/SSS contained in the 1st subframe and the 0th subframe are only transmitted as an example, as a PSS and an SSS in the LTE TDD are located at two neighboring subframes, two neighboring subframes containing a PSS and an SSS may be transmitted simultaneously each time (that is, an actual duration of transmitting signals are 2 ms), or a slot containing an SSS and a slot containing a PSS may be transmitted only (that is, an actual duration of transmitting signals are still 1 ms).

In a further implementation, if the discovery signals are one or more of a CRS, a CSIRS, a PRS, and a reduced CRS, the cell needs only to normally transmit signals at an agreed time.

In still another implementation, if the discovery signals are constituted by PSS/SSS and other discovery signals (such as one or more of a CRS, a CSIRS, a PRS, and a reduced CRS), the cell base station may transmit the PSS/SSS via one subframe or two subframes, or two neighboring slots, and transmit the other discovery signals in time-frequency resources containing the PSS/SSS.

In particular, a cell (such as a single cell in a dormancy mode, or a cell having independent physical cell ID and belonging to a cell group (or cluster)) may also transmit the other discovery signals needed by the UE in the time-frequency resources containing the PSS/SSS transmitted by it. A method of transmitting the PSS/SSS may be in consistence with what is described above. Furthermore, the other discovery signals (such as a CRS, a CSIRS, a PRS, or a reduced CRS) may also be transmitted in a subframe containing the PSS/SSS (such as the signal containing a group of PSS/SSS of LTE TDD as described above), or two subframes (such as the signals containing a group of PSS/SSS of LTE TDD with a duration of 2 ms as described above), or an incomplete subframe with a duration of 1 ms (such as the signal containing a group of PSS/SSS of LTE TDD with a duration of 1 ms as described above).

In this embodiment, the cell may also be a cell having no independent physical cell identifier within a cell group (or cluster); and the discovery signal may include a 1st stage discovery signal corresponding to an independent physical cell identifier of the cell group (or cluster) and a 2nd stage discovery signal corresponding to a cell identifier of the cell within the cell group (or cluster). The 1st stage discovery signal may include a primary synchronization signal and a secondary synchronization signal, and the 2nd stage discovery signal may include one of the following signals or a combination thereof: a CRS, a CSIRS, a PRS and a reduced CRS.

In particular, if physical cell identifier of all cells within a cell cluster is identical, and the cells within the cell cluster are differentiated by virtual ID, all the cells within the cell cluster may transmit identical 1st stage discovery signals (corresponding to the physical cell ID of the cell group (or cluster)) and different 2nd stage discovery signals (corresponding to the virtual ID of each cell within the cell group (or cluster)). For example, the 1st stage discovery signal may be PSS/SSS, and the 2nd stage discovery signal may be a CRS, or a CSIRS, or a PRS, or a reduced CRS.

In an implementation, if there exist other cells in an active mode in the cell cluster where the cell (such as a dormancy cell) is located, the dormancy cell may transmit the 1st stage discovery signal and the 2nd stage discovery signal at the same time.

The cell base station may transmit the 1st stage discovery signal by one subframe or two subframes or two neighboring slots, and transmit the 2nd stage discovery signal in the time-frequency resources of the 1st stage discovery signal. That is, the method of transmission is identical to the above-described implementation where the PSS/SSS and other discovery signals (such as CRSs, or CSIRSs, or PRSs, or reduced CRSs) constitute the discovery signals jointly.

In another implementation, if there exist other cells in an active mode in the cell cluster where the cell (such as a dormancy cell) is located, the dormancy cell may transmit the 2nd stage discovery signal only; and base stations of the active cells in the cell group (or cluster) may transmit 1st stage discovery signals corresponding to the independent physical cell ID of the cell group (or cluster).

In particular, the dormancy cell may transmit the 2nd stage discovery signal only. The UE may first determine the physical cell ID of the cell group (or cluster) according to the 1st stage discovery signals of the active cells and obtain coarse synchronization, and then determine the virtual ID of the dormancy cell according to the 2nd stage discovery signal of the dormancy cell and obtain fine synchronization.

In such a case, whether the dormancy cell transmits and the discovery signal may be agreed in advance, such as providing definitely in the standards; and may also be configured by a controller of the cell group (or cluster). The controller here may be a macro cell base station covering the cell group (or cluster), and may also be stand-alone equipment within the cell group (or cluster), such as control equipment dedicated to control or a cell within the cell group (or cluster).

In a further implementation, if all the cells in the cell cluster where the cell (such as a dormancy cell) is located are in a dormancy mode, the dormancy cell may transmit the 1st stage discovery signal and the 2nd stage discovery signal at the same time, and may also transmit the 2nd stage discovery signal only, and base stations of other cells within the cell group (or cluster) transmit the 1st stage discovery signals corresponding to the independent physical cell ID of the cell group (or cluster).

In particular, there may be only a part of the cells transmit the 1st stage discovery signals, and each cell transmits the respective 2nd stage discovery signal corresponding to the virtual ID of itself. Furthermore, it may be that a cell does not separately transmit the 1st stage discovery signal, and the 1st stage discovery signal of a cell is always transmitted together with the 2nd stage discovery signal. The 2nd stage discovery signal of a cell may be separately transmitted or may be transmitted together with the 1st stage discovery signal. It should be ensured that when each of the 2nd stage discovery signals is transmitted, a 1st stage discovery signal is transmitted together, and this 1st stage discovery signal may be transmitted by another cell of the cell group (or cluster).

It should be noted that how the cell transmits the discovery signal is illustrated above only. However, the present disclosure is not limited thereto, appropriate modification or adjustment may be made according to the above description, and a particular implementation may be determined according to an actual situation.

In this embodiment, in order to increase a probability of correctly detecting the discovery signal by the UE, quality of the discovery signal received at the UE side, such as a signal to interference plus noise ratio (SINR), may be increased by using the following method.

In an implementation, the cell base station may increase transmission power of the discovery signal. Such a method may be referred to as a method of increasing transmission power.

For example, power of the base station of the dormancy cell for transmitting the discovery signal may be greater than power of the dormancy cell for transmitting a measurement signal, and/or greater than general transmission power of an active cell for serving for the UE. A level of the increase of the transmission power may be configured by a controller of the cell group (or cluster) or a macro cell covering a location of the cell.

In another implementation, the cell base station may coordinate with other base stations, so that transmission of signals by the other base stations are avoided or power of the other base stations for transmitting signals are reduced in the time-frequency resources of the cell base station for transmitting the discovery signal. Such a method may be referred to as a method of interference coordination.

For example, the dormancy cell may coordinate with an active cell, so that transmission of signals by the active cell in the time-frequency resources of the dormancy cell for transmitting the discovery signal is avoided, or power of the active cell for transmitting signals in the time-frequency resources is reduced.

In a further implementation, the cell base station may coordinate with other base stations, so that discovery signals of different cells can be transmitted at different time points. Such a method may be referred to as a method of interference avoidance.

For example, transmission of discovery signals by different dormancy cells is staggered over time. And a particular offset may be obtained through calculation according to physical cell ID or virtual ID of the dormancy cells, or may be configured by a controller of the cell group (or cluster) or a macro cell covering a location of the cells.

In particular implementation, one of the above implementations may be used or the above implementations may be combined for use. If the above method of increasing transmission power is used and there exists priori information at the UE side (for example, a ratio of amplification of the transmission power of the discovery signal over the transmission power of the measurement signal is known), the UE may use the signal for RRM measurement.

If the above method of interference coordination or interference avoidance is used and there exists priori information at the UE side (for example, an interference level experienced by the discovery signal is equivalent to that experienced by the measurement signal), the UE may use the signal for RRM measurement; otherwise, the UE may use the signal for reference signal received power (RSRP) measurement only, and may not use the signal for RSSI measurement and RSRQ measurement.

If the above method of increasing transmission power and the method of interference coordination or interference avoidance are used at the same time and there exists priori information at the UE side (for example, a ratio of amplification of the transmission power of the discovery signal over the transmission power of the measurement signal is known and an interference level experienced by the discovery signal is equivalent to that experienced by the measurement signal), the UE may use the signal for RRM measurement; and if there exists priori information at the UE side (for example, a ratio of amplification of the transmission power of the discovery signal over the transmission power of the measurement signal is known), the UE may use the signal for RSRP measurement. And the above priori information may be configured by a serving cell of the UE for the UE via radio resource control (RRC) signaling.

The cell base station transmitting the discovery signal is illustrated above. In a particular implementation, for example, a cell in a dormancy mode may periodically transmit the discovery signal, and a single time of transmission of the discovery signal may be controlled by a controller. The controller may be a macro base station, or a centralized controller in a cell group (or cluster), and may also be a base station of another cell in an active mode. And the relevant art may be referred to for details of the controller.

Figure 2:
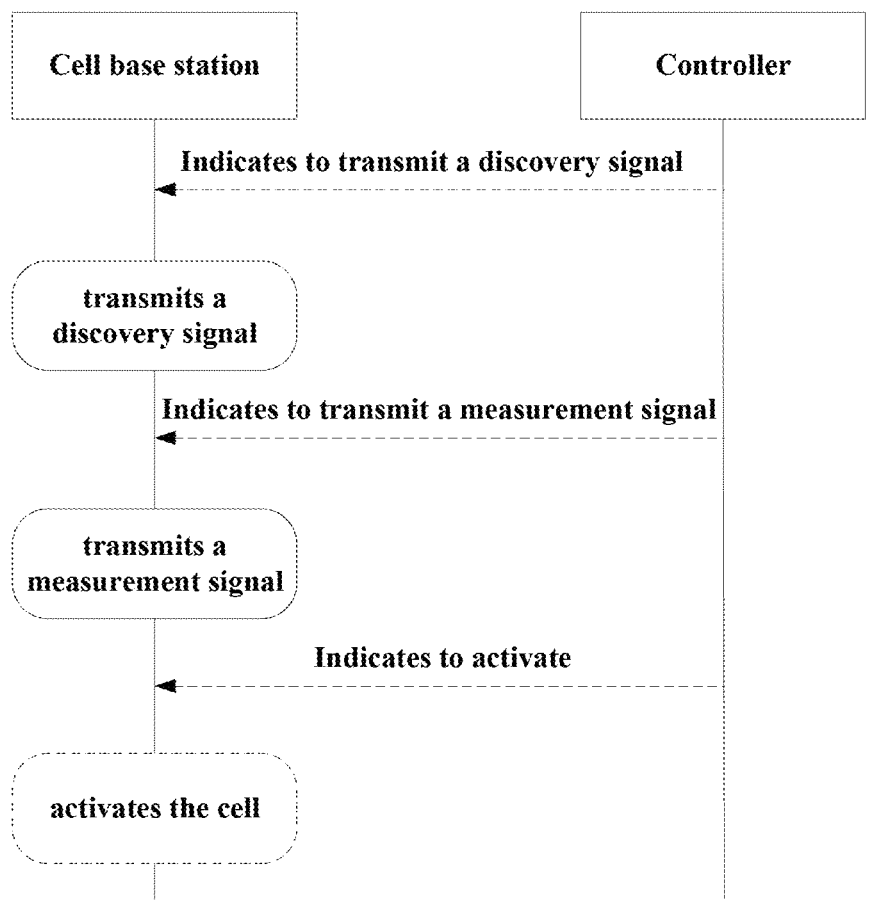
FIG. 2 is another flowchart of the cell discovery and measurement method of Embodiment 1 of the present disclosure.

FIG. 2 is another flowchart of the cell discovery and measurement method of the embodiment of the present disclosure, in which a process of interaction between a cell base station and a controller is shown.

As shown in FIG. 2, the controller may indicate the cell base station to transmit a discovery signal, and may indicate a cell in a dormancy mode to change a transmission period and transmission power of the discovery signal. Considering from a point of view of energy saving, a cell in a dormancy mode will transmit the discovery signal at a period as long as possible, and duration of each time of transmission is as short as possible. A single cell in a dormancy mode should transmit all discovery signals needed by UE at one time in a very short period as possible. For example, the cell may transmit PSS/SSS and/or other signals needed by the UE within one subframe.

As shown in FIG. 2, the controller may further indicate the cell base station to transmit a measurement signal. Furthermore, the controller may indicate the base station of the cell in the dormancy mode to activate the dormancy cell; and after receiving an instruction of the controller or an active message transmitted by another base station, the cell base station switches the cell from the dormancy mode into an active mode.

Transmitting the measurement signal by the cell base station shall be described below.

In this embodiment, the RRM measurement is mainly to measure power of a receiving signal and an interference level of the cell at the UE, so as to provide reference information for such decisions as cell switch, etc. Hence, if the measurement signal is transmitted in a very short duration like the discovery signal, it would be possible that an interference level subjected by the received signal of the cell cannot be correctly reflected due to a too short time of traversing, that is, deviation between measurement values of RSSI and RSRQ and real values may be large.

In step 102, the measurement signal may be transmitted at transmission power of the cell in serving for the UE, and the duration of transmission of the measurement signal at a single time is longer than or equal to the duration of transmission of the discovery signal at a single time.

Furthermore, if the cell increases the transmission power in transmitting the discovery signal and the UE side does not know a proportion of increase of the power of the discovery signal over the measurement signal, the UE will not use the discovery signal to perform the RRM measurement, even though the discovery signal and the measurement signal are a same kind of signal, such as CRS, or CSIRS, or reduced CRS. The UE may judge whether the transmission power of the discovery signal is increased by comparing receiving power of the discovery signal and that of the measurement signal, or whether the UE may use the discovery signal to perform the measurement may be configured for the UE by the serving cell of the UE via RRC layer signaling.

In this embodiment, the measurement signal may include one of the following or a combination thereof: a CRS, a CSIRS, a PRS, and a reduced CRS. However, the present disclosure is not limited thereto, and a particular signal may be determined according to an actual situation.

In an implementation, the cell base station may transmit the measurement signal after a predetermined period time of transmitting the discovery signal, so that the UE measures the cell according to the measurement signal after discovering the cell successfully.

For example, particular time for transmitting the measurement signal may be provided in standards, or transmitting the measurement signal and a particular time for transmitting the measurement signal may be configured by the controller for the dormancy cell, such as after a particular time after the discovery signal. In such a case, the controller may only notify the dormancy cell to transmit the measurement signal. The so-called particular time here may be, for example, identical for all dormancy cells, and may also be obtained through calculation according to the physical cell ID or virtual ID of the dormancy cell.

In another implementation, the cell base station may transmit the measurement signal in receiving a request of another cell or an instruction of the controller after transmitting the discovery signal. In this way, energies of the cell may further be saved, that is, the measurement signal is transmitted only in need (for example, UE needs to measure it). Furthermore, the controller may also notify the dormancy cell to transmit the measurement signal and may configure the time for transmitting the measurement signal.

In a further implementation, if the measurement signal is CSIRS or reduced CRS, it is possible that these signals do not exist in each subframe in an active cell. For example, it is possible that a transmission period of the CSIRS is: one of five subframes contains the CSIRS; and a transmission period of the reduced CRS may also be the same.

Hence, when the CSIRS or reduced CRS is taken as the measurement signal of the dormancy cell, they may be transmitted in consecutive subframes, so as to reduce a duration of "ON" state of the dormancy cell. For example, consecutive transmission of the CSIRS may be achieved by configuring multiple processes. It should be noted that taking that the reduced CRS is not necessarily transmitted in a full bandwidth into account, the reduced CRS is different from conventional CRS, even if it is transmitted in consecutive subframes.

In a particular implementation, if there exist multiple UEs discovering the cell, the cell may select transmission of the measurement signals, so as to further reduce transmission of signals and achieve energy saving.

For example, the dormancy cell first receives a message from a serving cell Cell-1 of UE-1 triggered by UE-1, and makes an agreement with Cell-1 to determine that the measurement signal is transmitted at a certain time point (for example, such an agreement may refer to that Cell-1 completely knows the transmission time of the measurement signal, and the agreement may be made by Cell-1 and the dormancy cell through negotiation, and may be provided in a standard in a manner of transmission at a fixed time).

Thereafter, the dormancy cell receives a message from a serving cell Cell-2 of UE-2 triggered by UE-2 and also needs to transmit the measurement signal, then the dormancy cell may reject a transmission time point provided by Cell-2 (if it is proposed by Cell-2), and transmit the time point agreed with Cell-1 to Cell-2, thereby avoiding retransmission of unnecessary measurement signals, and further achieving energy saving.

It can be seen from the above embodiment that by respectively transmitting the discovery signal and the measurement signal by the base station, the time for transmitting the discovery signal for a single time can be made as short as possible, an the interval between two times of transmitting the discovery signals can be made as long as possible, and the measurement signal is only transmitted in need, thereby making the cell as energy-saving as possible; and the UE can accurately perform RRM measurement via the measurement signal, thereby increasing precision of the RRM measurement.

Embodiment 2

An embodiment of the present disclosure provides a cell discovery and measurement method, which is applicable to a base station side of a serving cell of a UE, with contents identical to those in Embodiment 1 being not going to be described any further.

Figure 3:
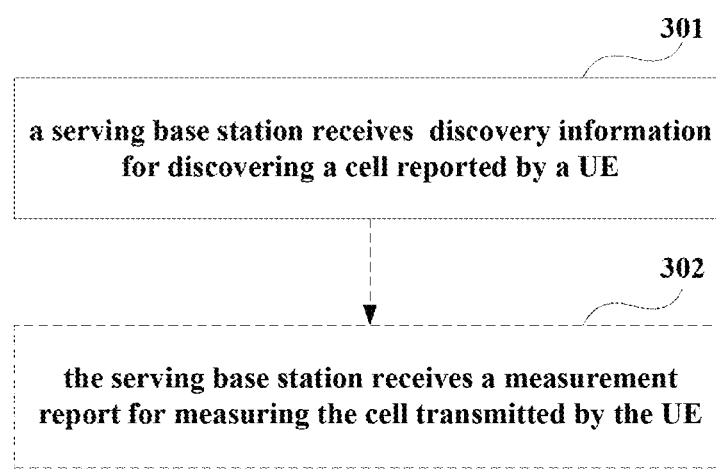
FIG. 3 is a flowchart of the cell discovery and measurement method of Embodiment 2 of the present disclosure.

FIG. 3 is a flowchart of the cell discovery and measurement method of the embodiment of the present disclosure. As shown in FIG. 3, the method includes:

step 301: a serving base station receives discovery information for discovering a cell reported by a UE.

The discovery information is generated from a discovery signal transmitted by a cell base station and received by the UE. The discovery signal and a measurement signal used for measuring the cell are transmitted by the cell base station respectively. And the discovery signal may also assist the UE in achieving synchronization with the cell base station.

As shown in FIG. 3, the method may further include:

step 302: alternatively, the serving base station receives a measurement report for measuring the cell transmitted by the UE.

In this embodiment, after the cell base station transmits the discovery signal (according to Embodiment 1), the UE receiving the discovery signal may discover the cell (such as a dormancy cell) according to the discovery signal, and the UE may report the discovery information for discovering the cell to the base station of the serving cell.

Furthermore, after the cell base station transmits the measurement signal (according to Embodiment 1), the UE receiving the measurement signal may perform RRM measurement on the cell (such as a dormancy cell) according to the measurement signal; and then the UE may report the measurement report to the base station of the serving cell in need.

Figure 4:
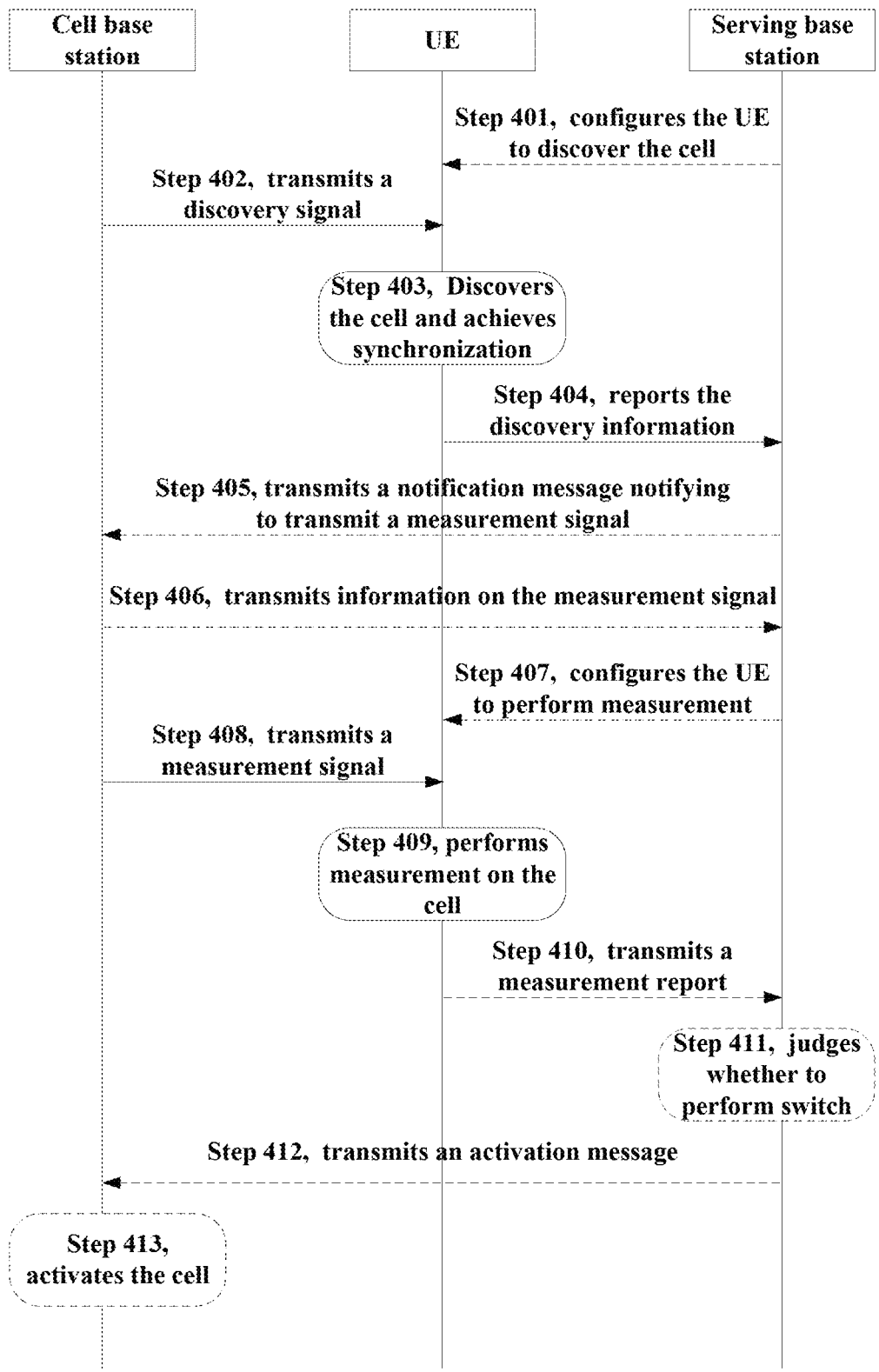
FIG. 4 is another flowchart of the cell discovery and measurement method of Embodiment 2 of the present disclosure.

FIG. 4 is another flowchart of the cell discovery and measurement method of the embodiment of the present disclosure, in which a process of interaction between the UE, the serving base station and the cell base station is shown. As shown in FIG. 4, the method includes:

step 401: the serving base station configures the UE to discover the cell.

Alternatively, the serving base station may configure the UE. For example, the UE may be configured with the physical cell ID and/or virtual ID of the cell (such as a dormancy cell) via RRC signaling, and/or, the UE may be informed whether a target dormancy base station is synchronized with the serving base station via RRC signaling, and/or, the UE may be informed of the positions of the frames/subframes/slots of the serving base station via RRC signaling, and the discovery signal will be transmitted by the dormancy base station at the positions.

step 402: the cell base station transmits the discovery signal; Embodiment 1 may be referred to for how to transmit the discovery signal;

step 403: the UE receives the discovery signal, discovers the cell according to the discovery signal, and achieves synchronization with the cell base station.

In particular, the relevant art may be referred to for how to discover a cell according to the discovery signal. Furthermore, if the UE determines that the cell is in a synchronized state with the serving cell before detecting the discovery signal, the UE no longer needs to perform coarse synchronization.

step 404: the UE reports discovery information to the serving base station.

The discovery information may include, for example, cell ID of the dormancy cell, etc.; however, the present disclosure is not limited thereto.

Step 405: the serving base station transmits a notification message to the cell base station, so as to notify the cell base station to transmit the measurement signal.

Alternatively, the serving base station may transmit the notification message notifying the cell base station to transmit the measurement signal. For example, the dormancy cell may only be notified to transmit the measurement signal; or transmission time of the measurement signal may be configured while notifying the dormancy cell to transmit the measurement signal, that is, the notification message contains information for configuring the transmission time of the measurement signal; or the transmission time of the measurement signal may be negotiated with the dormancy cell while notifying the dormancy cell to transmit the measurement signal, that is, the serving base station negotiates with the cell base station about the transmission time of the measurement signal.

In a particular implementation, when the base station of the serving cell receives discovery information of multiple UEs, the serving base station may select a transmission request for the measurement signal, so as to further reduce transmission of signals by the dormancy cell and achieve energy saving.

For example, the serving cell first receives a report that UE-A has detected a dormancy cell Cell-A and has transmitted a transmission request for the measurement signal to Cell-A; and the serving cell will not repeatedly transmit the transmission request for the measurement signal to Cell-A if a report that UE-B has detected the Cell-A is received before acknowledgement is obtained from Cell-A, thereby avoiding repeatedly transmission of unnecessary measurement signals.

Or, the serving cell first receives a report that UE-A has detected a dormancy cell Cell-A and has transmitted a transmission request for the measurement signal to Cell-A; and the serving cell will transmit configuration information on the measurement signal to UE-B instead of repeatedly transmitting the transmission request for the measurement signal to Cell-A, if a report that UE-B has detected the Cell-A is received after acknowledgement is obtained from Cell-A and UE-B may receive configuration information on transmission of the measurement signal before Cell-A transmits the measurement signal in consideration of delay of transmission of RRC signaling (possibly produced by protocols), thereby avoiding repeatedly transmission of unnecessary measurement signals.

Or, the serving cell first receives a report that UE-A has detected a dormancy cell Cell-A and has transmitted a transmission request for the measurement signal to Cell-A; and the serving cell will again transmit a transmission request for the measurement signal to Cell-A, once a report that UE-B has detected Cell-A is also received.

Step 406: the cell base station transmits measurement information on the measurement signal to the serving base station;

step 407: the serving base station receives the measurement information on the measurement signal transmitted by the cell base station, and configures the UE according to the measurement information.

Alternatively, the serving base station may configure the UE according to interaction between base stations, so that the UE measures the measurement signal transmitted by the cell.

Step 408: the cell base station transmits the measurement signal; Embodiment 1 may be referred to for detailed transmission;

step 409: the UE receives the measurement signal, and measures the cell according to the measurement signal;

step 410: the UE transmits a measurement report on measuring the cell to the serving base station.

Alternatively, if a measurement result triggers a measurement event configured at the UE side, the UE may transmit the measurement report to the serving base station.

Step 411: the serving base station judges whether to perform switch according to the measurement report, and switches the UE to the cell when it is judged that the switch needs to be performed.

Alternatively, the serving base station may judge whether it is needed to switch the UE to the cell (such as a dormancy cell).

Step 412: the serving base station transmits an activation message to the cell base station, so as to activate the cell; and step 413: the cell base station switches the cell from the dormancy mode to an active mode.

Alternatively, if the discovered cell is still in the dormancy mode, the serving base station where the UE discovering the cell is located may transmit the activation message to activate the dormancy cell.

The process of interaction between the UE, the serving base station and the cell base station is illustrated above. It should be noted that the present disclosure is not limited thereto, and appropriate adjustment may be made in particular implementation. For example, one or more of the alternative steps may be omitted, or an order of execution of the steps may be changed.

In particular implementation, the cell discovery and measurement may be achieved by a controller.

Figure 5:
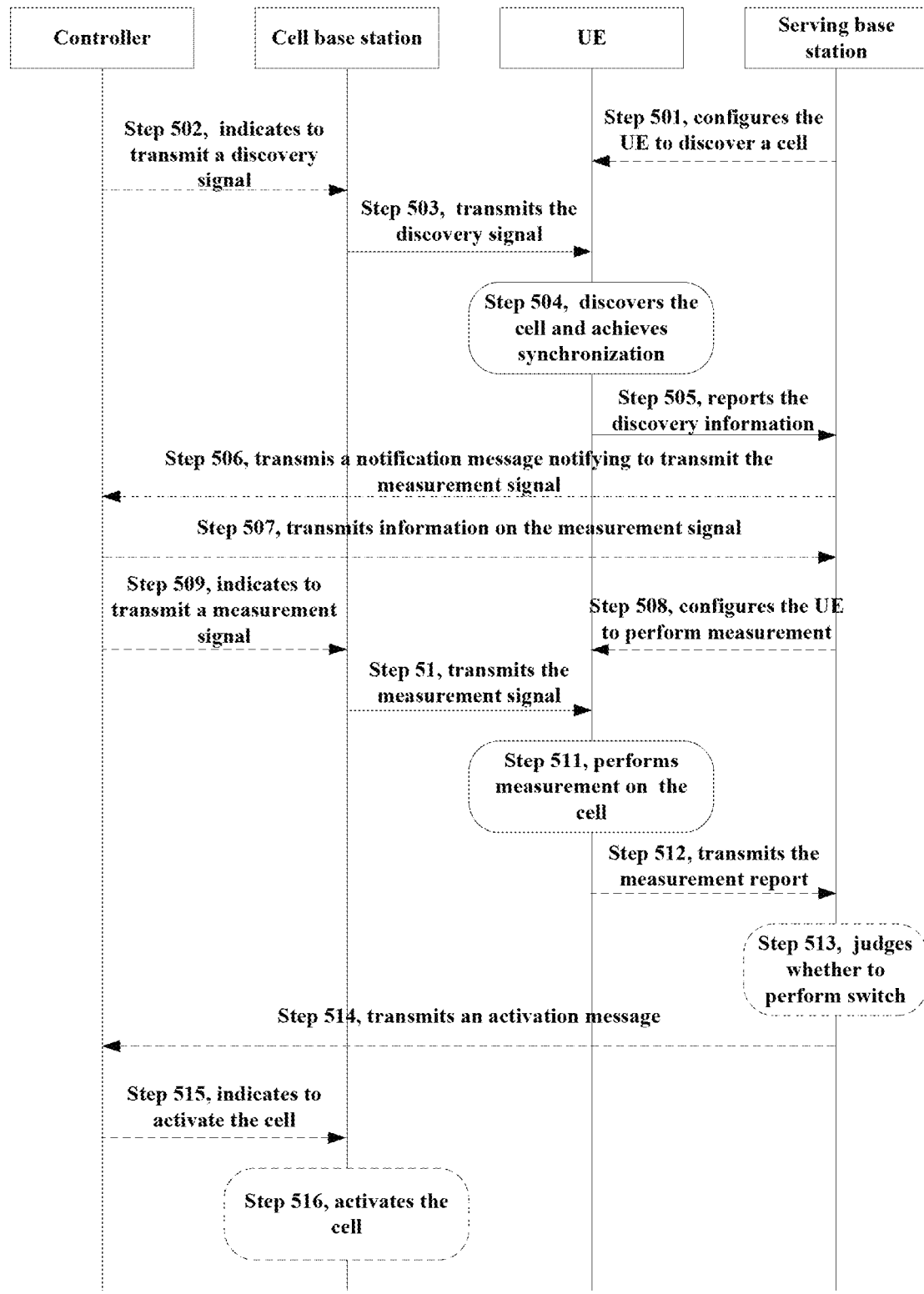
FIG. 5 is a further flowchart of the cell discovery and measurement method of Embodiment 2 of the present disclosure.

FIG. 5 is another flowchart of the cell discovery and measurement method of the embodiment of the present disclosure, in which a process of interaction between the UE, the serving base station, the controller and the cell base station is shown. As shown in FIG. 5, the method includes:

step 501: alternatively, the serving base station configures the UE to discover the cell;

step 502: alternatively, the cell base station receives an instruction from the controller indicating to transmit the discovery signal;

step 503: the cell base station transmits the discovery signal; Embodiment 1 may be referred to for detailed transmission;

step 504: the UE receives the discovery signal, discovers the cell according to the discovery signal, and achieves synchronization with the cell base station;

step 505: the UE reports discovery information to the serving base station;

step 506: alternatively, the serving base station transmits a notification message to the controller, so as to notify the cell base station to transmit the measurement signal;

step 507: alternatively, the controller transmits measurement information on the measurement signal to the serving base station;

step 508: alternatively, the serving base station receives the information on the measurement signal, and configures the UE according to the measurement information;

step 509: alternatively, the controller transmits an instruction indicating to transmit the measurement signal to the cell base station;

step 510: the cell base station transmits the measurement signal; Embodiment 1 may be referred to for detailed transmission;

step 511: the UE receives the measurement signal, and measures the cell according to the measurement signal;

step 512: alternatively, the UE transmits a measurement report on measuring the cell to the serving base station;

step 513: alternatively, the serving base station judges whether to perform switch according to the measurement report, and switches the UE to the cell when it is judged that the switch needs to be performed;

step 514: alternatively, the serving base station transmits an activation message to the controller;

step 515: alternatively, the controller transmits an instruction indicating to activate the cell to the cell base station; and step 516: alternatively, the cell base station switches the cell from the dormancy mode to an active mode.

The process of interaction between the UE, the serving base station and the cell base station is illustrated above. It should be noted that the present disclosure is not limited thereto, and appropriate adjustment may be made in particular implementation. For example, one or more of the alternative steps may be omitted, or an order of execution of the steps may be changed. For example, step 501 may be executed after steps 502 and 503, etc.

It can be seen from the above embodiment that by respectively transmitting the discovery signal and the measurement signal by the base station, the time for transmitting the discovery signal for a single time can be made as short as possible, an interval between two times of transmitting the discovery signals can be made as long as possible, and the measurement signal is only transmitted in need, thereby making the cell as energy-saving as possible; and the UE can accurately perform RRM measurement by measuring the signal, thereby increasing precision of the RRM measurement.

Embodiment 3

An embodiment of the present disclosure provides a cell discovery and measurement method, which is applicable to a UE side, with contents identical to those in Embodiment 1 or 2 being not going to be described any further.

Figure 6:
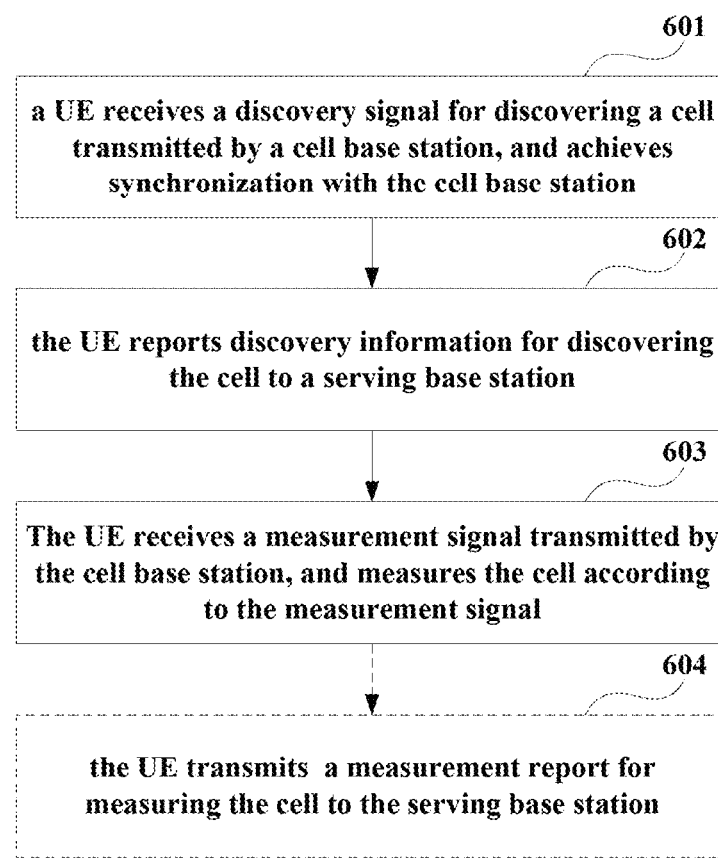
FIG. 6 is a flowchart of the cell discovery and measurement method of Embodiment 3 of the present disclosure.

FIG. 6 is a flowchart of the cell discovery and measurement method of the embodiment of the present disclosure. As shown in FIG. 6, the method includes:

step 601: a UE receives a discovery signal for discovering a cell transmitted by a cell base station, and achieves synchronization with the cell base station;

step 602: the UE reports discovery information for discovering the cell to a serving base station; and step 603: the UE receives a measurement signal transmitted by the cell base station, and measures the cell according to the measurement signal.

As shown in FIG. 6, the method may further include:

step 604: alternatively, the UE transmits a measurement report for measuring the cell to the serving base station.

In a particular implementation, the UE may report the discovery information to the serving base station by using RRC signaling, and may also transmit the measurement report to the serving base station via RRC signaling.

Figure 7:
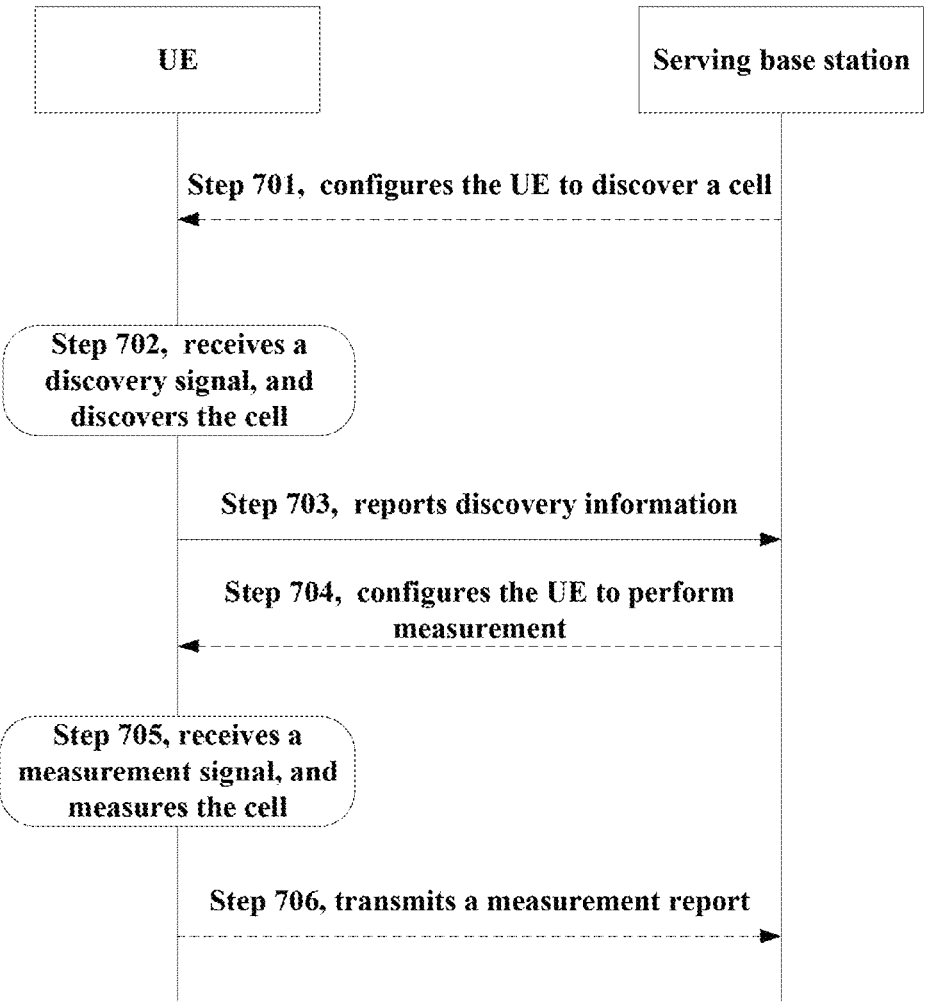
FIG. 7 is another flowchart of the cell discovery and measurement method of Embodiment 3 of the present disclosure.

FIG. 7 is another flowchart of the cell discovery and measurement method of the embodiment of the present disclosure, in which a process of interaction between the UE and the serving base station is shown. As shown in FIG. 7, the method includes:

step 701: alternatively, the serving base station configures the UE to discover the cell;

step 702: the UE receives a discovery signal, discovers the cell according to the discovery signal, and achieves synchronization with the cell base station;

step 703: the UE reports discovery information to the serving base station;

step 704: alternatively, the serving base station configures the UE to perform measurement;

step 705: the UE receives the measurement signal, and measures the cell according to the measurement signal; and step 706: alternatively, the UE transmits a measurement report on measuring the cell to the serving base station.

It can be seen from the above embodiment that by respectively transmitting the discovery signal and the measurement signal by the base station, the time for transmitting the discovery signal for a single time can be made as short as possible, an interval between two times of transmitting the discovery signals can be made as long as possible, and the measurement signal is only transmitted in need, thereby making the cell as energy-saving as possible; and the UE can accurately perform RRM measurement by measuring the signal, thereby increasing precision of the RRM measurement.

Embodiment 4

An embodiment of the present disclosure provides a base station, corresponding to the cell discovery and measurement method according to Embodiment 1, with contents identical to those in Embodiment 1 being not going to be described any further.

Figure 8:
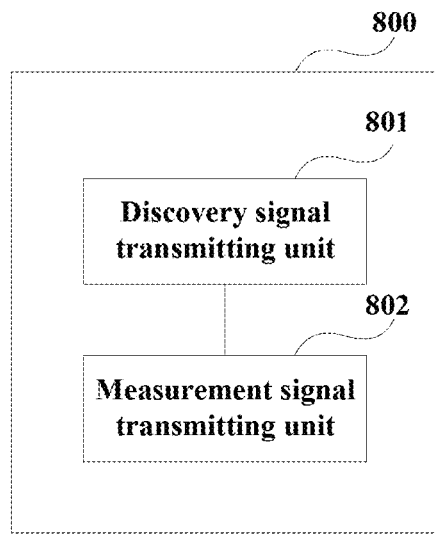
FIG. 8 is a schematic diagram of a structure of the base station of Embodiment 4 of the present disclosure.

FIG. 8 is a schematic diagram of a structure of the base station of the embodiment of the present disclosure. As shown in FIG. 8, the base station 800 includes: a discovery signal transmitting unit 801 and a measurement signal transmitting unit 802. The prior art may be referred to for other components of the base station 800 not shown in the figure.

The discovery signal transmitting unit 801 is configured to transmit a discovery signal enabling a cell to be discovered by a UE, and enable the UE to achieve synchronization with the base station; and the measurement signal transmitting unit 802 is configured to transmit a measurement signal after transmitting the discovery signal.

In this embodiment, the cell may be a dormancy cell; however, the present disclosure is not limited thereto.

In an implementation, the cell is an independent cell having independent physical cell identifier, or a cell having independent physical cell identifier within a cell group (or cluster); and the discovery signal transmitting unit 801 is configured to transmit the discovery signal by using one or two subframes, or two neighboring time slots.

In another implementation, the cell is a cell having no single physical cell identifier within a cell group (or cluster); and the discovery signal include a 2nd stage discovery signal corresponding to cell identifier within the cell group (or cluster); or include a 1st stage discovery signal corresponding to single physical cell identifier of the cell group (or cluster) and a 2nd stage discovery signal corresponding to cell identifier within the cell group (or cluster).

Figure 9:
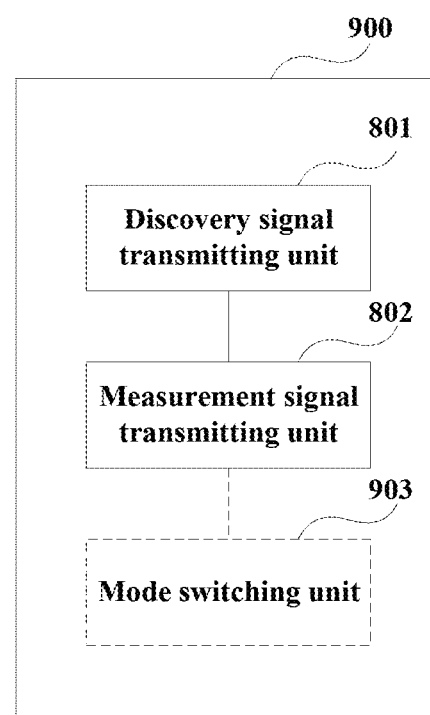
FIG. 9 is another schematic diagram of the structure of the base station of Embodiment 4 of the present disclosure.

FIG. 9 is another schematic diagram of the structure of the base station of the embodiment of the present disclosure. As shown in FIG. 9, the base station 900 includes: a discovery signal transmitting unit 801 and a measurement signal transmitting unit 802, as described above.

As shown in FIG. 9, the base station 900 may further include a mode switching unit 903 configured to switch the cell from a dormancy mode into an active mode after receiving an instruction of a controller or an activation message transmitted by another base station.

The components of the cell base station are illustrated above. It should be noted that the present disclosure is not limited thereto, and appropriate adjustment may be made in particular implementation. For example, one or more of the alternative components may be omitted, and signal connection between the components may be appropriately adjusted according to an actual situation, etc.

It can be seen from the above embodiment that by respectively transmitting the discovery signal and the measurement signal by the base station, the time for transmitting the discovery signal for a single time can be made as short as possible, an interval between two times of transmitting the discovery signals can be made as long as possible, and the measurement signal is only transmitted in need, thereby making the cell as energy-saving as possible; and the UE can accurately perform RRM measurement by measuring the signal, thereby increasing precision of the RRM measurement.

Embodiment 5

An embodiment of the present disclosure provides a base station, corresponding to the cell discovery and measurement method according to Embodiment 2, with contents identical to those in Embodiment 2 being not going to be described any further.

Figure 10:
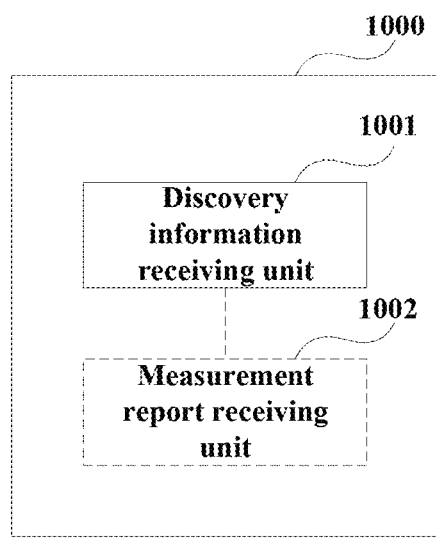
FIG. 10 is a schematic diagram of a structure of the base station of Embodiment 5 of the present disclosure.

FIG. 10 is a schematic diagram of a structure of the base station of the embodiment of the present disclosure. As shown in FIG. 10, the base station 1000 includes: a discovery information receiving unit 1001. The prior art may be referred to for other components of the base station 1000 not shown in the figure.

The discovery information receiving unit 1001 is configured to receive discovery information for discovering a cell reported by a UE. The discovery information is generated from a discovery signal transmitted by a cell base station and received by the UE. The discovery signal and a measurement signal used for measuring the cell are transmitted by the cell base station respectively. And the discovery signal may also assist the UE in achieving synchronization with the cell base station.

As shown in FIG. 10, the base station 1000 may further include a measurement report receiving unit 1002 configured to receive a measurement report for measuring the cell transmitted by the UE.

Figure 11:
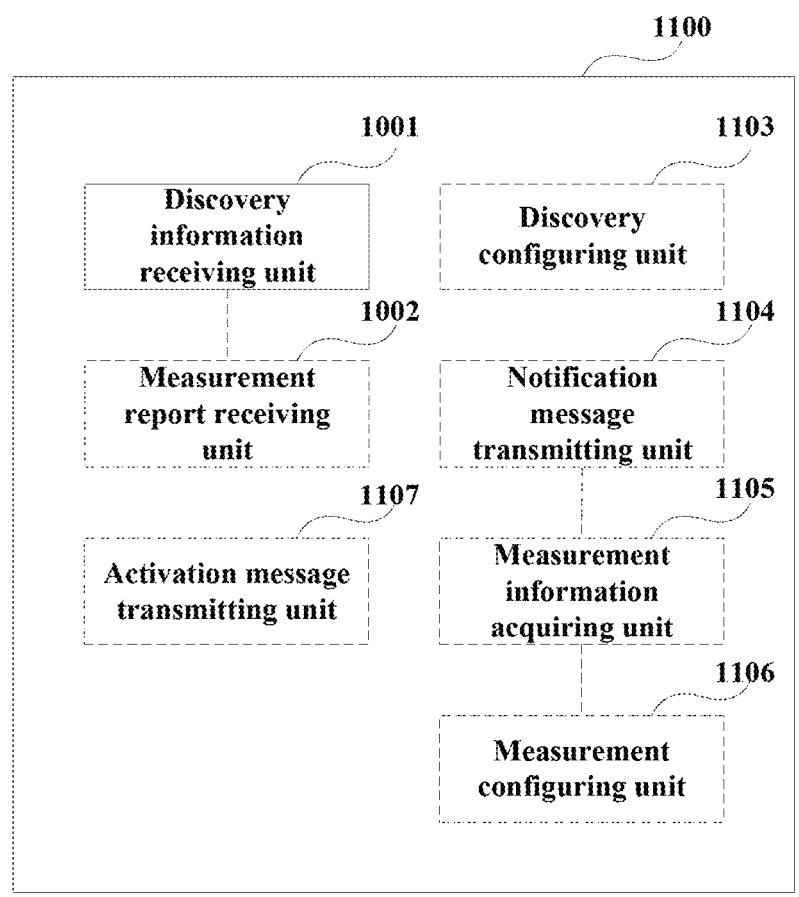
FIG. 11 is another schematic diagram of the structure of the base station of Embodiment 5 of the present disclosure.

FIG. 11 is another schematic diagram of the structure of the base station of the embodiment of the present disclosure. As shown in FIG. 11, the base station 1100 includes: a discovery information receiving unit 1001 and a measurement report receiving unit 1002, as described above.

As shown in FIG. 11, the base station 1100 may further include a discovery configuring unit 1103 configured to configure the UE to discover the cell.

As shown in FIG. 11, the base station 1100 may further include a notification message transmitting unit 1104 configured to transmit a notification message to a base station or a controller of the cell, so as to notify the cell to transmit a measurement signal.

As shown in FIG. 11, the base station 1100 may further include a measurement information acquiring unit 1105 and a measurement configuring unit 1106. The measurement information acquiring unit 1105 is configured to acquire measurement information of the cell transmitting the measurement signal, and the measurement configuring unit 1106 is configured to configure the UE according to the measurement information, so that the UE measures the measurement signal transmitted by the cell.

As shown in FIG. 11, the base station 1100 may further include an activation message transmitting unit 1107 configured to transmit an activation message to the base station or the controller of the cell, so as to activate the cell.

The components of the serving base station are illustrated above. It should be noted that the present disclosure is not limited thereto, and appropriate adjustment may be made in particular implementation. For example, one or more of the alternative components may be omitted, and signal connection between the components may be appropriately adjusted according to an actual situation, etc.

It can be seen from the above embodiment that by respectively transmitting the discovery signal and the measurement signal by the base station, the time for transmitting the discovery signal for a single time can be made as short as possible, an interval between two times of transmitting the discovery signals can be made as long as possible, and the measurement signal is only transmitted in need, thereby making the cell as energy-saving as possible; and the UE can accurately perform RRM measurement by measuring the signal, thereby increasing precision of the RRM measurement.

Embodiment 6

An embodiment of the present disclosure provides a UE, corresponding to the cell discovery and measurement method according to Embodiment 3, with contents identical to those in Embodiment 3 being not going to be described any further.

Figure 12:
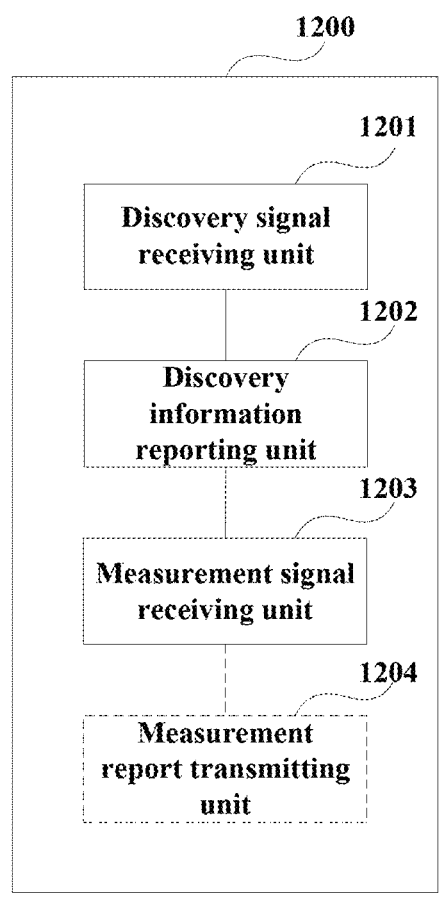
FIG. 12 is a schematic diagram of a structure of the UE of Embodiment 6 of the present disclosure.

FIG. 12 is a schematic diagram of a structure of the UE of the embodiment of the present disclosure. As shown in FIG. 12, the UE 1200 includes: a discovery signal receiving unit 1201, a discovery information reporting unit 1202 and a measurement signal receiving unit 1203. The prior art may be referred to for other components of the UE 1200 not shown in the figure.

The discovery signal receiving unit 1201 is configured to receive a discovery signal for discovering a cell transmitted by a cell base station, and achieve synchronization with the cell base station, the discovery information reporting unit 1202 is configured to report discovery information for discovering the cell to a serving cell, and the measurement signal receiving unit 1203 is configured to receive a measurement signal transmitted by the cell base station, and measure the cell according to the measurement signal.

As shown in FIG. 12, the UE 1200 may further include: a measurement report transmitting unit 1204 configured to transmit a measurement report for measuring the cell to the serving base station.

The components of the UE are illustrated above. It should be noted that the present disclosure is not limited thereto, and appropriate adjustment may be made in particular implementation. For example, one or more of the alternative components may be omitted, and signal connection between the components may be appropriately adjusted according to an actual situation, etc.

It can be seen from the above embodiment that by respectively transmitting the discovery signal and the measurement signal by the base station, the time for transmitting the discovery signal for a single time can be made as short as possible, an interval between two times of transmitting the discovery signals can be made as long as possible, and the measurement signal is only transmitted in need, thereby making the cell as energy-saving as possible; and the UE can accurately perform RRM measurement by measuring the signal, thereby increasing precision of the RRM measurement.

Embodiment 7

An embodiment of the present disclosure provides a communication system, including the base station as described in Embodiment 4, the base station as described in Embodiment 5, and the UE as described in Embodiment 6.

Figure 13:
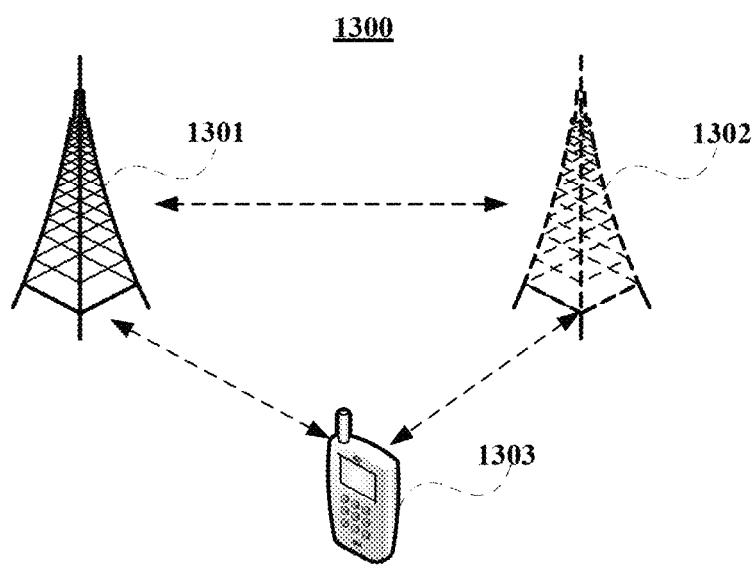
FIG. 13 is a schematic diagram of a structure of the communication system of Embodiment 7 of the present disclosure.

FIG. 13 is a schematic diagram of a structure of the communication system of the embodiment of the present disclosure. As shown in FIG. 13, the communication system 1300 includes a cell base station 1301, a serving base station 1302 and UE 1303.

The cell base station 1301 is configured to transmit a discovery signal enabling a cell to be discovered by the UE 1303, enable the UE 1303 to achieve synchronization with the cell base station 1301, and transmit a measurement signal after transmitting the discovery signal;

the serving base station 1302 is configured to receive discovery information discovering the cell reported by the UE 1303, and alternatively, to receive a measurement report on measuring the cell transmitted by the UE 1303;

and the UE 1303 is configured to receive the discovery signal for discovering the cell transmitted by the cell base station 1301, and achieve synchronization with the cell base station 1301; report discovery information discovering the cell to the serving base station 1302; and receive the measurement signal transmitted by the cell base station 1301, and measure the cell according to the measurement signal.

An embodiment of the present disclosure further provides a computer-readable program, wherein when the program is executed in a base station, the program enables a computer to carry out the cell discovery and measurement method as described in Embodiment 1 or 2 in the base station.

An embodiment of the present disclosure further provides a storage medium in which a computer-readable program is stored, wherein the computer-readable program enables a computer to carry out the cell discovery and measurement method as described in Embodiment 1 or 2 in a base station.

An embodiment of the present disclosure further provides a computer-readable program, wherein when the program is executed in a UE, the program enables a computer to carry out the cell discovery and measurement method as described in Embodiment 3 in the UE.

An embodiment of the present disclosure further provides a storage medium in which a computer-readable program is stored, wherein the computer-readable program enables a computer to carry out the cell discovery and measurement method as described in Embodiment 3 in a UE.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in Figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:

1. A base station, comprising:
   a processor and a memory coupled to the processor that stores a plurality of instructions;
   the processor is configured to execute the instructions to:
   switch a cell in between an active mode and a dormancy mode, wherein any signal other than a discovery signal is not transmitted from the base station of the cell in the dormancy mode;
   transmit the discovery signal periodically over a period time in both the active mode and the dormancy mode, which enables the cell to be discovered by a UE, and enable the UE to achieve synchronization with the base station of the cell in both the active mode and the dormancy mode; wherein the cell is an independent cell having an independent physical cell identifier or the cell is a cell having an independent physical cell identifier within a cell group or a cell cluster, and the discovery signal comprises at least one subframe including a primary synchronization signal and a secondary synchronization signal together with any of other discovery signals.

2. The base station according to claim 1, wherein
the discovery signal comprises a primary synchronization signal, a secondary synchronization signal, and one or more of a common reference signal, a channel state information reference signal, a positioning reference signal and a reduced common reference signal.

3. The base station according to claim 1, wherein the processor is further configured to transmit the discovery signal at the 0th subframe or the 5th subframe, or transmit the discovery signal at the 0th subframe and the 5th subframe.

4. The base station according to claim 2, wherein the primary synchronization signal is arranged at a 1st subframe or a 6th subframe, and the secondary synchronization signal is arranged at a 0th subframe or a 5th subframe;
and the processor is further configured to transmit two neighboring subframes or two neighboring slots containing the primary synchronization signal and the secondary synchronization signal.

5. The base station according to claim 1, wherein the processor is further configured to transmit the discovery signal by using two subframes, or two neighboring time slots.

6. The base station according to claim 1, wherein the cell is a cell having no independent physical cell identifier within a cell group or a cell cluster;
and the discovery signal comprises a 2nd stage discovery signal corresponding to a cell identifier within the cell group or the cell cluster; or comprises a 1st stage discovery signal corresponding to an independent physical cell identifier of the cell group or the cell cluster and a 2nd stage discovery signal corresponding to a cell identifier within the cell group or the cell cluster.

7. The base station according to claim 1, wherein the base station is configured to increase transmission power of the discovery signal; or
the base station is configured to coordinate with other base stations, so that signal transmission by the other base stations is avoided or power of transmitting signals by the other base stations is decreased in the time-frequency resources where the processor transmits the discovery signal; or
the base station is configured to coordinate with the other base stations, so that discovery signals of different cells are transmitted at different time points.

8. The base station according to claim 1, wherein
the processor is further configured to execute the instructions to transmit a measurement signal after transmitting the discovery,
the measurement signal being transmitted at the transmission power of the cell in serving for the UE;
a single transmission duration of the measurement signal being equal to or greater than a single transmission duration of the discovery signal.

9. The base station according to claim 1, wherein the processor is further configured to transmit the measurement signal when a predefined time period after the processor transmits the discovery signal is exceeded;
or the processor is further configured to transmit the measurement signal after the processor transmits the discovery signal, on receiving a request of another cell or an instruction of a controller.

10. The base station according to claim 1, wherein the measurement signal comprises one of the following signals or a combination thereof: a common reference signal, a channel state information reference signal, a positioning reference signal and a reduced common reference signal.

11. The base station according to claim 1, wherein the processor is further configured to switch the cell from a dormancy mode into an active mode after receiving an instruction of a controller or an activation message transmitted by another base station.

12. A base station according to claim 1, wherein
a transmitting interval between transmission of the discovery signal and next transmission of the discovery signal is set as long as possible for the energy saving.

13. A UE, comprising:
a processor and a memory coupled to the processor that stores a plurality of instructions;
the processor is configured to execute the instructions to:
receive a discovery signal for discovering a cell transmitted periodically over a period time in both an active mode and a dormancy mode by a base station, wherein any signal other than the discovery signal is not transmitted from the base station of the cell in the dormancy mode, and achieve synchronization with the base station of the cell in both the active mode and the dormancy mode; and
report discovery information for discovering the cell to a serving base station,
wherein the cell is an independent cell having an independent physical cell identifier or the cell is a cell having an independent physical cell identifier within a cell group or a cell cluster, the cell is switched in between an active mode and a dormancy mode, the discovery signal comprises at least one subframe including a primary synchronization signal and a secondary synchronization signal together with any of other discovery signals.

14. The UE according to claim 13, wherein the processor is further configured to transmit a measurement report for measuring the cell to the serving base station.

15. A communication system, comprising:
a base station configured to switch a cell in between an active mode and a dormancy mode, wherein any signal other than a discovery signal is not transmitted from the base station of the cell in the dormancy mode, transmit the discovery signal periodically over a period time in both the active mode and the dormancy mode, which enables the cell to be discovered by a UE, and enable the UE to achieve synchronization with the base station of the cell in both the active mode and the dormancy mode;
a serving base station configured to receive discovery information discovering the cell reported by the UE; and
the UE configured to receive the discovery signal for discovering the cell transmitted by the base station, and achieve synchronization with the base station of the cell in both the active mode and the dormancy mode; report discovery information discovering the cell to the serving base station,
wherein the cell is an independent cell having an independent physical cell identifier or the cell is a cell having an independent physical cell identifier within a cell group or a cell cluster, and the discovery signal comprises at least one subframe including a primary synchronization signal and a secondary synchronization signal together with any of other discovery signals.

16. A method of base station, comprising:
switching a cell in between an active mode and a dormancy mode, wherein any signal other than a discovery signal is not transmitted from the base station of the cell in the dormancy mode; and
transmitting the discovery signal periodically over a period time in both the active mode and the dormancy mode, which enables the cell to be discovered by a UE, and enable the UE to achieve synchronization with the base station of the cell in both the active mode and the dormancy mode,
wherein the cell is an independent cell having an independent physical cell identifier or the cell is a cell having an independent physical cell identifier within a cell group or a cell cluster, and the discovery signal comprises at least one subframe including a primary synchronization signal and a secondary synchronization signal together with any of other discovery signals.

17. The method of base station according to claim 16, further comprising instructing the UE to discover the cell.

18. The method of base station according to claim 16, further comprising instructing the UE to transmit a notification message to a base station or a controller of the cell, so as to notify the cell to transmit a measurement signal.

19. The method of base station according to claim 16, further comprising
instructing the UE to acquire measurement information of the cell transmitting a measurement signal; and
instructing the UE according to the measurement information, so that the UE measures the measurement signal transmitted by the cell.

20. The method of base station according to claim 16, further comprising instructing the UE to transmit an activation message to the base station or the controller of the cell, so as to activate the cell.

* * * * *